United States Patent [19]

Nojima et al.

[11] 3,862,264

[45] Jan. 21, 1975

[54] CHLORINATED POLYVINYL CHLORIDE COMPOSITION

[76] Inventors: Yosuhiro Nojima; Horiharu Ikeda, both of 700, Torgainishi, Settsu City, Osaka; Akira Amou, 456 Kariwake, Tsukaguchi, Amagasaki, all of Japan

[22] Filed: Sept. 7, 1972

[21] Appl. No.: 286,847

Related U.S. Application Data

[63] Continuation-in-part of Ser. No. 63,025, Aug. 11, 1970, abandoned.

[30] Foreign Application Priority Data

Aug. 30, 1969 Japan.............................. 44-68859

[52] U.S. Cl............ 260/876 R, 260/80.81, 260/880, 260/881, 260/885, 260/899, 260/23.7 H
[51] Int. Cl......................... C08f 15/00, C08f 19/00
[58] Field of Search.............. 260/876 R, 880, 80.81

[56] References Cited
UNITED STATES PATENTS

| | | | |
|---|---|---|---|
| 2,996,489 | 8/1961 | Dennis et al....................... | 260/92.8 |
| 3,463,833 | 8/1969 | Isogawa............................ | 260/876 R |
| 3,520,953 | 7/1970 | Sugimoto et al.................... | 260/890 |
| 3,535,220 | 10/1970 | Kato et al......................... | 260/23 X |
| 3,560,592 | 2/1971 | Decroly et al..................... | 260/876 |
| 3,678,132 | 7/1972 | Isogawa et al..................... | 260/876 R |

*Primary Examiner*—John C. Bleutge
*Assistant Examiner*—Richard B. Turner
*Attorney, Agent, or Firm*—Moonray Kojima

[57] ABSTRACT

Thermoplastic resinous compositions consisting essentially of a blend of (1) 10 to 70% by weight of a chlorinated vinyl chloride resin having a chlorine content of 61 to 70% and specific viscosity ($\eta SP$) being 0.18 to 0.35, and (2) 90 to 30% by weight of a resin blend consisting essentially of (A) 80 to 40% by weight of a resin copolymer consisting essentially of 30 to 80% by weight of alpha methyl styrene, 5 to 50% by weight of methyl methacrylate, and 3 to 30% by weight of acrylonitrile; and (B) 20 to 60% by weight of a graft copolymer consisting essentially of 65 to 35% by weight butadiene homopolymer or copolymer containing more than 50% of butadiene copolymerizable with other monoolefinic monomers and 35 to 65% by weight of monomers of 25 to 80% by weight of styrne, 10 to 75% by weight of methyl methacrylate and 0 to 25% by weight of acrylonitrile.

11 Claims, No Drawings

CHLORINATED POLYVINYL CHLORIDE COMPOSITION

This application is a continuation in part of Ser. No. 63,025 filed Aug. 11, 1970 and now abandoned.

BACKGROUND OF THE INVENTION

The present invention relates to thermoplastic resinous compositions having good impact resistance, heat resistance and processing.

Various kinds of thermoplastic resins are now commercially available but almost all of these are inferior in either heat resistance or impact resistance or both, or have poor processing although they may be excellent in their mechanical properties.

Many attempts have been proposed to overcome such difficulties but the improvements proposed are insufficient. For example, one of thermoplastic resinous compositions in which the aforesaid properties are improved is disclosed in U.S. Pat. No. 3,463,833, but the moldings such as pipes and sheets prepared by extruding this resin composition are insufficient in impact strength. Also this resinous composition is still insufficient in processing.

U.S. Pat. No. 3,520,953 teaches a vinyl chloride resin composition consisting essentially of a blend of vinyl chloride resin and an interpolymer of four monomers: styrene, acrylonitrile, methyl methacrylate, and alpha methyl styrene, and in another embodiment an additional butadiene polymer. This composition leaves much to be desired in such properties as softening point or processing and tensile strength. The chlorination of polyvinyl chloride is taught for example in U.S. Pat No. 2,996,489.

SUMMARY OF INVENTION

Therefore, an object of the present invention is to provide an improved thermoplastic resinous composition having no such faults. In other words, the object of the present invention is to provide a thermoplastic resinous composition having easy processing and which is capable of providing moldings having high impact resistance and high heat resistance.

Thus, according to the present invention, there is provided a thermoplastic resinous composition comprising a uniform blend consisting essentially of (A) a resin prepared by copolymerizing monomers consisting essentially of 30 to 80% by weight of alpha methyl styrene, 5 to 50% by weight of methyl methacrylate, and 3 to 30% by weight of acrylonitrile; (B) a graft copolymer prepared by graft copolymerizing 35 to 65% by weight of monomers consisting essentially of 25 to 80% by weight of styrene, 10 to 75% by weight of methyl methacrylate, and 0 to 25% by weight of acrylonitrile to 65 to 35% by weight of a butadienic polymer; and (C) a chlorinated vinyl chloride resin having a chlorine content of 61 to 70% and specific viscosity ($\eta$ SP) being 0.18 to 0.35 (in nitrobenzene solvent according to Japanese Industrial Standard (JIS)- K6721; hereinafter the same); the total proportion of 80 to 40% by weight of said resin (A) and, 20 to 60% by weight of said graft copolymer (B) being 90 to 30% by weight, and the proportion of said chlorinated vinyl chloride resin (C) being 10 to 70% by weight.

DETAILED DESCRIPTION OF PREFERRED EMBODIMENTS

As mentioned above, resin (A) is prepared by copolymerizing monomers consisting essentially of 30 to 80% by weight of alpha methyl styrene, 5 to 50% by weight of methyl methacrylate, and 3 to 30% by weight of acrylonitrile.

In resin (A), alpha methyl styrene contributes to an improvement in the heat resistance of the final resinous composition but if the proportion thereof is lower than 30% by weight, the effect is lessened, while if the proportion is higher than 80% by weight, the final resinous composition lacks impact resistance.

Methyl methacrylate contributes to an improvement in the heat resistance of the final resinous composition but if the proportion thereof is lower than 5% by weight, its effects are lessened, while if the proportion is higher than 50% by weight, in particular, when employing an emulsion polymerization process, the stability of the latex, during polymerization is reduced and the tendency to cream during polymerization becomes severe.

Also, acrylonitrile is quite important as it improves the compatibility with the chlorinated vinyl chloride resin and therefore improves the processing and the polymerizability of monomer. If the proportion of acrylonitrile is lower than 3% by weight, the addition thereof becomes meaningless, while if the proportion is higher than 30% by weight, it causes undesirable coloring and a reduction in the heat resistance and the processing of the final resinous composition.

The copolymerization may be conducted by bulk polymerization, suspension polymerization or emulsion polymerization, but when preparing a copolymer containing a larger amount of alpha methyl styrene, which is preferable to obtain the improved thermoplastic resinous copolymer of the present invention, better results are obtained through emulsion polymerization method.

Graft copolymer (B) is prepared by graft copolymerizing to 65 to 35% by weight of the monomers mentioned previously to 35 to 65% by weight of a butadienic polymer.

As for the butadienic polymer used, these include polybutadiene and copolymers of more than 50% by weight of butadiene and other monoolefinic monomers such as styrene, acrylonitrile, and methyl methacrylate. Moreover, in order to obtain the graft polymer most suitable for the thermoplastic resinous composition of this invention, it is preferable to use latex particles of which at least 80% by weight are larger than 0.1 microns.

The mixing ratios of monomers to be graft copolymerized to the butadienic polymer are 25 to 80% by weight of styrene, 10 to 75%, and preferably, 20 to 50% by weight of methyl methacrylate, and 0 to 25% by weight of acrylonitrile. The addition of monomers may be employed at will; these are added divisionally or continuously either alone or as a mixture.

If the proportion of styrene is lower than 25% by weight, the molding property of the final resinous composition is reduced. Also, in consequence of the proportion of methyl methacrylate is higher, the processing of the resinous composition is reduced, and the stability of latex when the graft copolymerization is conducted by an emulsion polymerization is lower. Furthermore, if the proportion of acrylonitrile is higher than 25% by weight, the impact resistance of the final resinous composition is degraded and the stability of the latex when emulsion polymerization methid is employed is lowered.

Chlorinated vinyl chloride resin (C) employed in the present invention is formed by chlorinating polyvinyl chloride or a copolymer prepared by copolymerization of vinyl chloride in major proportion and comonomers (for example, vinyl acetate, methyl methacrylate, styrene, vinylidene chloride, and the like) in minor proportions. The resin should have a chlorine content of 61 to 70% and a specific viscosity ($\eta$ SP) of 0.18 to 0.35. If the specific viscosity is lower than 0.18, processing of the final resinous composition is good but mechanical properties are inferior, while if the specific viscosity is higher than 0.35, the processing of the final resinous composition is poor. Any of the normally acceptable methods of chlorination can be employed, such as gas phase method, liquid method, or suspension method or other similar methods.

The thermoplastic resinous composition of the present invention may be obtained by blending the aforementioned three components (A), (B), and (C). Their mixing ratios are 90 to 30% by weight of the total amount of 80 to 40% by weight of resin (A) and 20 to 60% by weight of graft copolymer (B) and 10 to 70% by weight of chlorinated vinyl chloride resin (C). The resinous composition prepared without such ratios is inferior in either heat resistance or impact resistance or molding property. These components may be mixed by means of a Banbury mixer, a mixing roll, an extruder, etc, but a system wherein they are mixed in latex states and then the latex mixture is solidified may be employed.

The effects of the present invention are as follows:

1. As the chlorinated vinyl chloride resin content is increased in the resinous composition, the impact resistance thereof is increased. Moreover, when the proportion of the chlorinated vinyl chloride resin is about 60% by weight, the impact resistance of the resinous composition becomes maximum, the value of which is markedly higher than those of any components. The fact is clear from Table 5 described hereinbelow.

2. The softening point of the final resinous composition is higher than a plus average softening point of any components. This fact is clear from Table 5, Experiments No. 9 and Table 6. It is ordinary that the softening point of the resinous composition comprising more than two resins with different softening points is quite lower than a plus average softening point of any composition component. Nevertheless above unexpected effects can be obtained according to the present invention. This indicates that the invention is excellent.

3. The final resinous composition is, in particular, excellent in impact resistance, heat resistance and well balanced in other mechanical properties. The composition comprising two components of resin (A) and chlorinated vinyl chloride resin (C) is quite inferior in impact resistance, and while the composition comprising two components of graft copolymer (B) and chlorinated vinyl chloride resin (C) is quite inferior in softening point. This fact is clearly demonstrated in Table 4 shown below.

The thermoplastic resinous composition of the present invention may contain ordinary additives, such as coloring agent, heat and light stabilizers, a processing aid, etc, if necessary.

The thermoplastic resinous composition of this invention has excellent heat resistance and impact resistance and is suitable for injection molding and extrusion molding. In particular, it is suitable for use in extruded plastic pipes or sheets.

The invention will now be described with reference to the following examples.

EXAMPLE 1

Preparation of Resin (A)

In a reactor equipped with a stirrer, a reflux condenser, an inlet for nitrogen gas, a thermometer, and a droppingfunnel, were charged 250 parts by weight of water, 3.0 parts by weight of sodium oleate, 0.4 part by weight of sodium formaldehyde sulfoxylate dihydrate, 0.0025 part by weight of ferrous sulfate,(7 $H_2O$), and 0.01 part by weight of disodium ethylenediamine tetraacetate ($2H_2O$) and after purging oxygen, the mixture was stirred at 60° C in a nitrogen stream. Thereafter, a monomer mixture (the composition A-1 to 2 shown below in Table 1) having dissolved therein 0.3 part by weight of cumene hydroperoxide and 0.3 part by weight of mixed tertiary dodecyl mercaptans was continuously added dropwise through dropping funnel over a 6 hour period. After the monomer mixture was added, the resultant system was further stirred for 1 hour at 60° C. By blowing steam into the copolymer latex thus prepared, the unreacted monomers were removed and then the latex was coagulated, by adding sodium chloride and hydrochloric acid and heating to aggregate particles, which were collected by filtration, washed with water, and dried to provide a powdered product.

Preparation of Graft Copolymer (B)

Into the same reactor used above were charged 84.7 parts by weight of a large grain butadiene rubber latex (JSR-0700 Latex made by Nippon Synthetic Rubber Co.) containing solids (B-1 to 3 shown below in Table 2) and 215.3 parts by weight of water, 0.2% by weight of sodium formaldehyde sulfoxylate ($2H_2O$), 0.0025 part by weight of ferrous sulfate ($7H_2O$), and 0.01 part by weight of disodium ethylenediamine tetraacetate ($2H_2O$) and after purging oxygen from the reactor, the mixture was stirred at 60° C in a nitrogen stream. Thereafter a monomer mixture (the composition B-1 to 3 shown below in Table 2) having dissolved therein 0.2 part by weight of cumene hydroperoxide and 0.1 part by weight of mixed tertiary dodecyl mercaptans, was continuously added dropwise to the system through the dropping funnel over a 3 hour period. Thereafter, the resultant system was further stirred for 1 hour at 60° C. By blowing steam into the graft polymer latex thus formed, the unreacted monomers were removed. The latex was coagulated with sodium chloride and hydrochloric acid and heated to aggregate the particles thereof, which were recovered by filtration, washed with water and dried to provide the powdered product.

Preparation of Chlorinated Vinyl Chloride Resin (C)

167 parts of vinyl chloride resin polymerized and obtained by using methyl cellulose as a dispersing agent and 1000 parts of water were charged into a reaction vessel equipped with an agitator. The air in the system was completely displaced with nitrogen gas, and the vinyl chloride resin was well suspended in water while keeping the liquid temperature at 50° C under agitation. After well dissolving chlorine into this suspension, while chlorine gas is being bubbled in at the flow rate of 2.5 l/min., the irradiation from 100 watt mercury lamp was commenced, and under this condition, the chlorination reaction was carried out. After it was completed, unreacted chlorine gas was expelled with nitrogen gas, and the unreacted product was taken out, washed, neutralized, washed again, dehydrated, and then dried. In this way, chlorinated vinyl chloride resins (C-1 to 5 shown below in Table 3) were obtained.

TABLE 1.

The compositions of Resin (A)

| | Alpha Methyl styrene | Methyl methacrylate | Acrylonitrile |
|---|---|---|---|
| A-1 | 53 | 40 | 7 |
| A-2 | 72 | 12 | 16 |

TABLE 2.

The compositions of Graft Copolymer (B)

| | Polybutadiene (solid content) | Styrene | Methyl methacrylate | Acrylonitrile |
|---|---|---|---|---|
| B-1 | 55 | 24 | 15 | 6 |
| B-2 | 50 | 15 | 35 | 0 |
| B-3 | 55 | 24 | 21 | 0 |

TABLE 3.

Physical properties of chlorinated vinyl chloride

| | Chlorine content (%) | Softening points (Vicat value)(°C) | Specific viscosity ($\eta$ SP) |
|---|---|---|---|
| C-1 | 63 | 100.1 | 0.20 |
| C-2 | 64 | 108.2 | 0.28 |
| C-3 | 66 | 116.8 | 0.27 |
| C-4 | 68 | 124.7 | 0.25 |
| C-5 | 68 | 131.2 | 0.38 |

(Note) C-5 is a contrast example.

Preparation of Thermoplastic Resinous Composition

Each mixture of resins which is shown below in Table 4-I, was blended well by mixer together with 5 grams of tribasic lead, 0.5 gram of barium stearate, 0.2 gram of cadmium stearate, and 0.2 gram of lead stearate for 5 minutes on a roll mill heated to 185° C to provide a sheet of each resin composition. The sheet thus obtained was pressed at 180° C and the physical properties thereof are shown in Table 4-II.

TABLE 4-I.

Mixing ratios of resins.

| Experiments Nos. | Resin (A) | | Graft copolymer (B) | | | Chlorinated vinyl chloride resin (C) | | |
|---|---|---|---|---|---|---|---|---|
| | A-1 | A-2 | B-1 | B-2 | B-3 | C-1 | C-2 | C-3 |
| 1 | 35 | | 15 | | | | 50 | |
| 2 | | 35 | 15 | | | | 50 | |
| 3 | 24 | | 16 | | | | 60 | |
| 4 | | 24 | | | 16 | | 60 | |
| 5 | 28 | | | 12 | | 30 | | 30 |
| 6 | 35 | | 15 | | | | 50 | |
| 7 | 50 | | | | | | 50 | |
| 8 | | | 50 | | | | 50 | |

(Note)
1. Figures in parts by weight.
2. 7 and 8 are contrast examples

TABLE 4-II.

Physical properties

| Experiments Nos. | Softening point (°C) | Impact resistance (kg.cm./cm²) | Tensile strength (kg/cm²) | Extensibility (%) | Flow property ($10^{-2}$ml/sec) |
|---|---|---|---|---|---|
| 1 | 116.2 | 21.2 | 542 | 35 | 3.7 |
| 2 | 117.8 | 13.8 | 584 | 22 | 4.4 |
| 3 | 110.9 | 23.8 | 500 | 45 | 2.9 |
| 4 | 111.0 | 14.3 | 506 | 50 | 4.0 |
| 5 | 115.5 | 14.9 | 579 | 37 | 3.3 |
| 6 | 117.9 | 17.6 | 552 | 31 | 2.8 |
| 7 | 119.8 | 2.4 | 675 | 4 | 2.8 |
| 8 | 112.7 | 17.7 | 468 | 35 | 2.5 |

(Notes)
1. Softening point (Vicat value) ISO - R306, Load 5 Kg. (International Organization for Standard - Recommendation)
2. Impact Resistance (Izod value) ASTM-D256
3. Tensile Strength. JIS-K6745 (Japanese Industrial Standard)
4. Flow property (Koka-type flow value) Nozzle 1$\phi$ × 10L, 200°C, Load, 150 kg/cm².

TABLE 7

| Experiment No. | Screw (RPM) | Cylinder temp. (°C) | Dice Temp. (°C) | Extruding amount (kg/hr) | molding property | outside view of pipe |
| --- | --- | --- | --- | --- | --- | --- |
| 24 | 20–30 | 170–185 | 190–200 | 25–35 | good | good |
| 25 | 10 | 180–190 | 200–210 | – | bad and decomposed | extruding impossible |

EXAMPLE 2

Among each resin obtained in Example 1, the composition of resin (A-1) and graft copolymer (B-1) in a weight ratio of 7:3 was mixed with resin (C-3) as shown in Table 5, and thereafter the mixture was molded and measured were the physical properties as in Example 1. The results thereof are shown in Table 5.

TABLE 5.

| Experiment No. | Composition of (A-1) and (B-1) | C-3 | Softening point (°C) | Impact resistance kg.cm/cm² | Tensile strength (kg)cm² | Extensibility (%) | Flow property ($10^{-2}$ ml/sec) |
| --- | --- | --- | --- | --- | --- | --- | --- |
| 9 | 100 | 0 | 114.9 | 11.6 | 450 | 8 | 6.4 |
| 10 | 90 | 10 | 119.0 | 11.9 | 476 | 15 | 5.1 |
| 11 | 80 | 20 | 118.8 | 13.3 | 491 | 16 | 4.4 |
| 12 | 70 | 30 | 118.3 | 13.2 | 507 | 23 | 3.7 |
| 13 | 60 | 40 | 118.1 | 15.2 | 532 | 25 | 3.1 |
| 6 | 50 | 50 | 117.9 | 17.6 | 552 | 31 | 2.8 |
| 14 | 40 | 60 | 117.8 | 19.8 | 555 | 37 | 2.4 |
| 15 | 30 | 70 | 117.5 | 16.6 | 593 | 42 | 1.9 |
| 16 | 20 | 80 | 117.1 | 10.9 | 611 | 49 | 1.6 |
| 17 | 10 | 90 | 117.0 | 6.1 | 620 | 53 | 1.1 |
| 18 | 0 | 100 | 116.8 | 4.6 | 640 | 60 | 0.8 |

(Note)
1. Measurements are made in the same way as in Table 4.
2. Experiments Nos. 9, 16, 17 and 18 are contrasts.

EXAMPLE 3

50 parts by weight of the composition of resin (A-1) and graft copolymer (B-1) in a weight ratio of 7:3 were mixed with various chlorinated vinyl chloride resins (C-1 to 5) as shown in Table 6, and thereafter, the mixtures, were each molded and measured as to physical properties as in Example 1. There results thereof are shown in Table 6.

TABLE 6

| Experiment No. | Resin (C) | Softening point (°C) | Impact Resistance kg.cm/cm² | Tensile strength (kg/cm²) | Extensibility (%) | Flow property $10^{-2}$ ml/sec |
| --- | --- | --- | --- | --- | --- | --- |
| 19 | C-1 | 113.8 | 21.4 | 505 | 40 | 9.0 |
| 20 | C-2 | 116.2 | 21.2 | 542 | 35 | 3.7 |
| 21 | C-3 | 117.9 | 17.6 | 561 | 31 | 2.8 |
| 22 | C-4 | 121.2 | 16.7 | 572 | 27 | 2.5 |
| 23 | C-5 | 127.6 | 7.2 | 573 | 26 | 1.2 |

EXAMPLE 4

As to each composition of Experiment Nos. 20 and 23, extruding test to provide a 1.2 inch piper was carried out by using a 65 dia. single screw typ extruder (L/D = 22). The extruding conditions and the results thereof are shown in Table 7 hereinbelow.

As is clear from the above table, when chlorinated vinyl chloride resin (C-5) having a specific viscosity ($\eta SP$) of more than 0.35 is used, the resinous composition is quite inferior in molding property and is impossible to be molded into a pipe.

EXAMPLE 5

Another essential feature is the use of a resin copolymer consisting essential of three monomers: alpha methyl styrene, methyl methacrylate and acrylonitrile. U.S. Pat No. 3,520,953 (Sugimoto) discloses a chlorinated PVC composition using an interpolymer having four monomers, alpha methyl styrene, methyl methacrylate, acrylonitrile and styrene. Experiments were carried out to show the unexpected results produced by elimination of the styrene in the copolymer.

i. Preparation of Interpolymer D-H

In a reactor equipped with a stirrer, a reflux condenser, an inlet for nitrogen gas, a thermometer, and a dropping funnel were charged 250 parts by weight of water, 3.0 parts by weight of sodium oleate, 0.4 part by weight of sodium formaldehyde sulfoxylate dihydrate, 0.0025 part by weight of ferrous sulfate($7H_2O$), and 0.01 part by weight of di-sodium ethylenediamine tetraacetate ($2H_2O$) and after purging oxygen, the mixture was stirred at 60° C in a nitrogen stream. Thereafter, 100 parts by weight of monomer mixtures, in the proportions shown below in Table 8, having dissolved therein 0.3 part by weight of cumene hydroperoxide and 0.3 part by weight of mixed tertiary dodecyl mercaptans was continuously added dropwise through the dropping funnel over a 6 hour period. After the monomer mixture was added, the resultant system was further stirred for 1 hour at 60° C. By blowing steam into the copolymer latex thus prepared, the unreacted monomers were removed and then the latex was coagulated, by adding sodium chloride and hydrochloric acid and heating to aggregate particles, which were collected by filtration, washed with water and dried to provide a powdered product.

TABLE 8

| Interpolymer | Methyl methacrylate (%) | Styrene (%) | Acrylonitrile (%) | α-Methyl-styrene (%) | Notes |
|---|---|---|---|---|---|
| D | 45 | 20 | 15 | 20 | Sugimoto |
| E | 39 | 20 | 7 | 34 | Sugimoto |
| F | 30 | 12 | 16 | 42 | Sugimoto |
| G | 27 | 0 | 11 | 62 | This invention |
| H | 12 | 0 | 16 | 72 | This invention | ii. Preparation of Chlorinated Vinyl Chloride Resin (I)

A mixture of 167 g of vinyl chloride resin (Geon 103EP produced by Japan Geon Co., average polymerization degree of 1035), 334 ml of concentrated (37% by weight) hydrochloric acid, 286 ml of water and 62 ml of chloroform were charged into 2 l reaction vessel equipped with an agitator. The air in the system was completely displaced with nitrogen gas, and the vinyl chloride resin was well suspended in water while keeping the liquid temperature at 50° C under agitation. After well dissolving chlorine into this suspension, while chlorine gas is being bubbled in at the flow rate of 2.5 l/min, the irradiation from 100 watt mercury lamp was commenced and under this condition, the chlorination reaction was carried out. After it was completed, unreacted chlorine gas was expelled with nitrogen, and the reacted product was taken out, washed, neutralized, washed again, dehydrated, and then dried. In this way, chlorinated vinyl chloride resin having chlorine content of 66.2%, softening point of 116.5° C and specific viscosity ($\eta$ SP) of 0.31 were obtained.

iii. Graft Polymer (B-2) as shown hereinabove, Example 1 is used as the Graft Polymer.

iv. As Vinyl Chloride Resin (J), Kanevinyl S1001 (produced by Assignee,(Kanagafuchi Kagaku Kogyo Kabushiki Kaisha), Average Polymerization Degree of 1030) is used.

v. Comparison of Properties of Final Resinous Compositions.

A mixture of 35 grams of interpolymer, 15 grams of graft polymer and 50 grams of chlorinated vinyl chloride resin or vinyl chloride resin as shown in Table 9 hereinbelow,, was blended well by mixer together with 5 grams of tribasic lead, 0.5 grams of barium stearate, 0.2 gram of cadmium stearate and 0.2 gram of lead stearate for 5 minutes on a roll mill heated to 185° C to provide a sheet. The sheet was pressed for 15 minutes at 185° C and the physical properties thereof were measured as shown in Table 10, hereinbelow.

TABLE 9

| Experiment No. | Interpolymer | Graft polymer | Chlorinated vinyl chloride resin | Vinyl chloride resin |
|---|---|---|---|---|
| 101 | D | B-2 | 1 | — |
| 102 | E | B-2 | 1 | — |
| 103 | F | B-2 | 1 | — |
| 104 | G | B-2 | 1 | — |
| 105 | H | B-2 | 1 | — |
| 106 | E | B-2 | — | J |

TABLE 10

| Experiment No. | Softening point (°C) | Impact resistance kg.cm/cm² | Tensile strength (kg/cm²) | Extensibility (%) |
|---|---|---|---|---|
| 101 | 105.4 | 15.9 | 514 | 17 |
| 102 | 111.6 | 14.8 | 527 | 20 |
| 103 | 110.5 | 17.2 | 528 | 23 |
| 104 | 118.2 | 17.9 | 565 | 27 |
| 105 | 120.7 | 18.9 | 563 | 28 |
| 106 | 91.8 | 21.7 | 499 | 33 |

(Notes)
1. Softening point (Vicat value). ISO - R 306, Load 5 kg. (International Organization for Standard Recommendation)
2. Impact resistance (Izod value) ASTM -D256
3. Tensile strength. (JIS-K6745)(Japanese Industrial Standard).

Experiments nos. 101, 102 and 103 correspond to a combination of compositions disclosed in Sugimoto (U.S. Pat No. 3,520,953) and Dannis et al. (U.S. Pat. No. 2,996,489). Experiments nos. 106 corresponds to Sugimoto, and 104 and 105 correspond to the instant invention. It is readily apparent that the inventive resinous compostions of this invention are superior especially in softening point and tensile strength, among others, to the resinous compositions of Sugimoto, or Sugimoto and Dannis et al., which are some examples of existing art compositions.

The foregoing description is merely for illustrative purposes. Numerous other variations and modifications of the invention would be apparent to one skilled in the art. All such variations and modifications are intended to be within the spirit and scope of the invention.

What is claimed is:

1. A chlorinated polyvinylchloride composition comprising a blend of
   1. 10 to 70 percent by weight of chlorinated vinyl chloride resin having chlorine content of from 61 to 70 percent and specific viscosity ($\eta_{sp}$) of from 0.18 to 0.35; and 2. 90 to 30 percent by weight of a resin blend consisting essentially of
   A. 80 to 40 percent by weight of resin copolymer prepared by copolymerizing a monomer mixture consisting essentially of 30 to 80 percent by weight of alpha methyl styrene, 5 to 50 percent by weight of methyl methacrylate, and 3 to 30 percent by weight of acrylonitrile, and
   B. 20 to 60 percent by weight of a graft copolymer prepared by graft copolymerizing 35 to 65 percent by weight of a monomer mixture of 25 to 80 percent by weight of styrene,, 10 to 75 percent by weight of methyl methacrylate, and 0 to 25 percent by weight of acrylonitrile onto 65 to 35 percent by weight of a butadiene homopolymer or copolymer containing more than 50 percent by weight of butadiene copolymerized with other monoolefinic monomers.

2. Composition of claim 1, where in said copolymer is prepared by copolymerizing a monomer mixture consisting essentially of 53 to 72 percent by weight of alpha methyl styrene, 12 to 40 percent by weight of methyl methacrylate, and 7 to 16 percent by weight of acrylonitrile.

3. Composition of claim 1, wherein said chlorinated vinyl chloride has a chlorine content of from 63 to 68 percent by weight, and said specific viscosity is from 0.02 to 0.28.

4. Composition of claim 1, wherein said copolymerization is an emulsion polymerization.

5. Composition of claim 1, wherein said monoolefinic monomers is selected from the group consisting of styrene, acrylonitrile, methyl methacrylate and mixtures thereof.

6. Composition of claim 1, wherein said homopolymer or copolymer of butadiene has at least 80 percent latex particles of size larger than 0.1 microns.

7. Composition of claim 1, wherein said chlorinated vinyl chloride resin is formed by chlorinating polyvinyl chloride or copolymers prepared by copolymerizing vinyl chloride in major proportions and comomomers in minor proportions.

8. Composition of claim 7, wherein said comonomers is selected from the group consisting of vinyl acetate, methyl methacrylate, styrene, vinylidene chloride and mixtures thereof.

9. Composition of claim 1, further comprising tribasic lead, barium stearate, cadmium stearate and lead stearate.

10. Composition of claim 1, wherein said chlorinated vinyl chloride resin comprises 60 percent by weight.

11. Composition of claim 1, further comprising coloring agent, heat stabilizer, light stabilizer, and processing agent.

* * * * *